United States Patent
Erdmann et al.

(12)

(10) Patent No.: US 10,975,920 B2
(45) Date of Patent: Apr. 13, 2021

(54) SYNCHRONIZER RING

(71) Applicant: DIEHL METALL STIFTUNG & CO. KG, Roethenbach (DE)

(72) Inventors: Knut Erdmann, Nuremberg (DE); Murat Arbak, Lauf an der Pegnitz (DE); Martin Doernhoefer, Sulzbach-Rosenberg (DE)

(73) Assignee: Diehl Metall Stiftung & Co. KG, Roethenbach (DE)

( * ) Notice: Subject to any disclaimer, the term of this patent is extended or adjusted under 35 U.S.C. 154(b) by 154 days.

(21) Appl. No.: 16/387,068

(22) Filed: Apr. 17, 2019

(65) Prior Publication Data
US 2019/0242441 A1    Aug. 8, 2019

Related U.S. Application Data

(63) Continuation-in-part of application No. PCT/EP2017/001244, filed on Oct. 24, 2017.

(30) Foreign Application Priority Data

Nov. 17, 2016  (DE) .......... 102016013716.9

(51) Int. Cl.
*F16D 23/06* (2006.01)
*F16D 23/02* (2006.01)
*F16D 23/14* (2006.01)

(52) U.S. Cl.
CPC .......... *F16D 23/025* (2013.01); *F16D 23/06* (2013.01)

(58) Field of Classification Search
CPC ........ F16D 23/025; F16D 23/06; F16D 23/14; F16D 2023/0656; F16H 2063/3093; F16H 63/30
See application file for complete search history.

(56) References Cited

U.S. PATENT DOCUMENTS 4,732,247 A * 3/1988 Frost ............... F16D 23/06
                                                    192/53.31
8,286,776 B2 * 10/2012 Doernhoefer ......... F16D 23/025
                                                    192/107 R
(Continued)

FOREIGN PATENT DOCUMENTS

CN    101198802 A    6/2008
CN    102192248 A    9/2011
(Continued)

*Primary Examiner* — Tinh Dang
(74) *Attorney, Agent, or Firm* — Laurence A. Greenberg; Werner H. Stemer; Ralph E. Locher

(57) ABSTRACT

A synchronizer ring is made of steel and has a main body with a conical friction surface. A toothing and at least one blocking body project radially outward from the main body. The blocking body has an engagement section extending in the axial direction. The engagement section has a first edge, which runs approximately parallel to a first end face of the main body and has a first width extending in the circumferential direction, and two mutually opposite second edges extending from the first edge. To improve the durability of the synchronizer ring, the second edges have a convex curvature in a plan view of the engagement section. A second width extending in the circumferential direction between the second edges is greater than the first width at a depth spaced apart from the first edge.

7 Claims, 2 Drawing Sheets

(56) References Cited

U.S. PATENT DOCUMENTS

| | | | |
|---|---|---|---|
| 9,133,894 B2 | 9/2015 | Christoffer et al. | |
| 10,344,807 B2* | 7/2019 | Damm | F16D 23/06 |
| 2013/0341148 A1 | 12/2013 | Christoffer | |
| 2016/0377125 A1* | 12/2016 | Christoffer | F16D 13/66 |
| | | | 192/107 M |

FOREIGN PATENT DOCUMENTS

| | | |
|---|---|---|
| CN | 104912957 A | 9/2015 |
| DE | 102012214345 A1 | 2/2014 |
| DE | 102014103173 A1 | 9/2015 |
| EP | 2136098 A1 | 12/2009 |
| EP | 2677188 B1 | 9/2015 |
| KR | 100834118 B1 | 6/2008 |

* cited by examiner

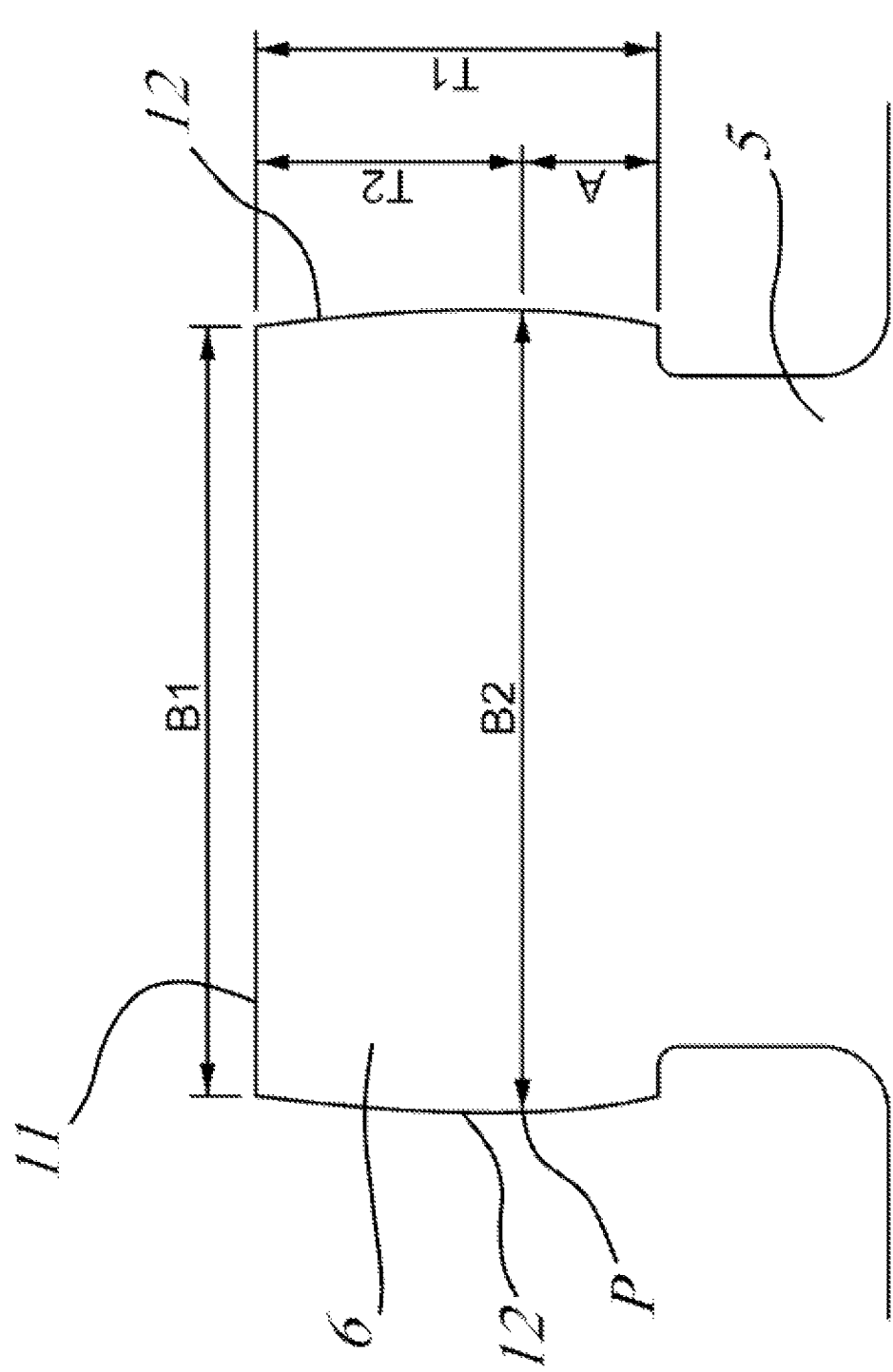

SYNCHRONIZER RING

CROSS-REFERENCE TO RELATED APPLICATION

This is a continuation application, under 35 U.S.C. § 120, of copending international application No. PCT/EP2017/001244, filed Oct. 24, 2017, which designated the United States; this application also claims the priority, under 35 U.S.C. § 119, of German patent application No. DE 10 2016 013 716.9, filed Nov. 17, 2016; the prior applications are herewith incorporated by reference in their entirety.

BACKGROUND OF THE INVENTION

Field of the Invention

The invention relates to a synchronizer ring according to the preamble of the independent patent claim.

A synchronizer ring of this kind is known from European patent EP 2 677 188 B1, corresponding to U.S. patent publication No. 2013/0341148, for example.

The known synchronizer ring has on the circumferential surface thereof a toothing for engagement in an internal toothing provided on a sliding collar. Moreover, radially projecting blocking bodies or index cams can be provided on the outer circumference of the synchronizer ring for engagement in recesses corresponding thereto on a synchronizer body connected for conjoint rotation to the shaft. A width of the blocking body in the circumferential direction and a further width of the recesses corresponding thereto in the synchronizer body are chosen in such a way that the synchronizer ring can rotate by a small angle relative to the synchronizer body.

Particularly in the case of synchronizer rings produced from steel, the blocking body can be formed by a tab bent over in the axial direction (index tab or index lug). During the synchronization process, dynamic forces act on the blocking body in the circumferential direction. These forces can lead to material fatigue, especially in the bent over region of the tab, and as a result to fracture of the tab.

SUMMARY OF THE INVENTION

It is the object of the invention to eliminate the disadvantages of the prior art. In particular, the intention is to specify a synchronizer ring with improved durability.

This object is achieved by the features of the independent patent claim. Advantageous embodiments of the invention will become apparent from the features of the dependent patent claims.

According to the inventors, the proposal is that the second edges 12 have a convex curvature in a radial plan view of the engagement section 6, wherein a second width B2 extending in the circumferential direction between the second edges 12 is greater than the first width B1 at a depth T2 spaced apart from the first edge 11.

In general, the term "depth" is taken to mean an axial distance from the first edge 11. A maximum depth T1 of the engagement section 6 corresponds approximately to the length of one of the second edges 12.

The term "in a radial plan view of the engagement section" is taken to mean a direction of view laterally from the outside of the synchronizer ring in the region of the engagement section 6. In other words: this direction of view is perpendicular to the axial direction and perpendicular to the axis of rotation of the synchronizer ring. The view of the engagement section 6 depicted in FIG. 2 is obtained in this direction of view.

Because of the convex curvature of the second edges 12, it is no longer possible during the synchronization process for the forces exerted on the synchronizer ring to act on the engagement section of the blocking body in the vicinity of the first edge 11. Because of the convex configuration of the second edges, a force application point P on the second edges is shifted by the depth T2 in the direction of the first end face of the main body of the synchronizer ring. As a result, a lever arm between the force application point P and a bent over section 5 of the blocking body is shortened. Consequently, it is possible to reduce the loads acting on the bent over section and thus to increase the durability of the synchronizer ring.

The above-described convex curvature of the second edges 12 is associated with an equal convex curvature of the surfaces adjoining the second edges 12. These adjoining surfaces are the narrow side faces or flanks of the engagement section 6 of the synchronizer ring, which can come into contact with the boundary surfaces of the recesses 9 of the external toothing 8 of the synchronizer body K. The orientation of the curvature of the side faces is such that the lateral projection of the side faces onto the plan view of the engagement section 6 (as depicted in FIG. 2, for example) coincides with the second edges 12 delimiting the side faces.

According to an advantageous embodiment, the following relationship applies to the ratio of the first width B1 to the second width B2:

$$B2=B1*K,$$

wherein K is a factor in the range of 1.005 to 1.09. The second width B2 is advantageously 0.05 to 0.4 mm, preferably 0.1 to 0.2 mm, greater than the first width B1.

It is advantageous if the toothing extends from a circumferential section adjoining the first end face of the main body. The blocking body can be formed by a tab extending from the circumferential section, wherein the tab has a bent over section and an engagement section, which extends from the latter in the axial direction to a second end face situated opposite the first end face of the main body. It is advantageous if a width of the engagement section extending in the circumferential direction, in particular the first B1 and the second width B2, is greater than a further width of the bent over section. This makes it easier to bend over the tab and contributes to ensuring that deformation takes place only in the region of the bent over section. As a result, the engagement section remains essentially flat, despite the deformation in the bent over section.

The toothing can be formed by toothing sections formed in sections in the circumferential direction. In this case, a blocking body can extend in each gap formed between two adjacent toothing sections.

It is advantageous if the convex shape of the second edges of the engagement section is produced by shearing.

Other features which are considered as characteristic for the invention are set forth in the appended claims.

Although the invention is illustrated and described herein as embodied in a synchronizer ring, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a plan view of a blocking body shown in FIG. 1.

DETAILED DESCRIPTION OF THE INVENTION

Figure 1:
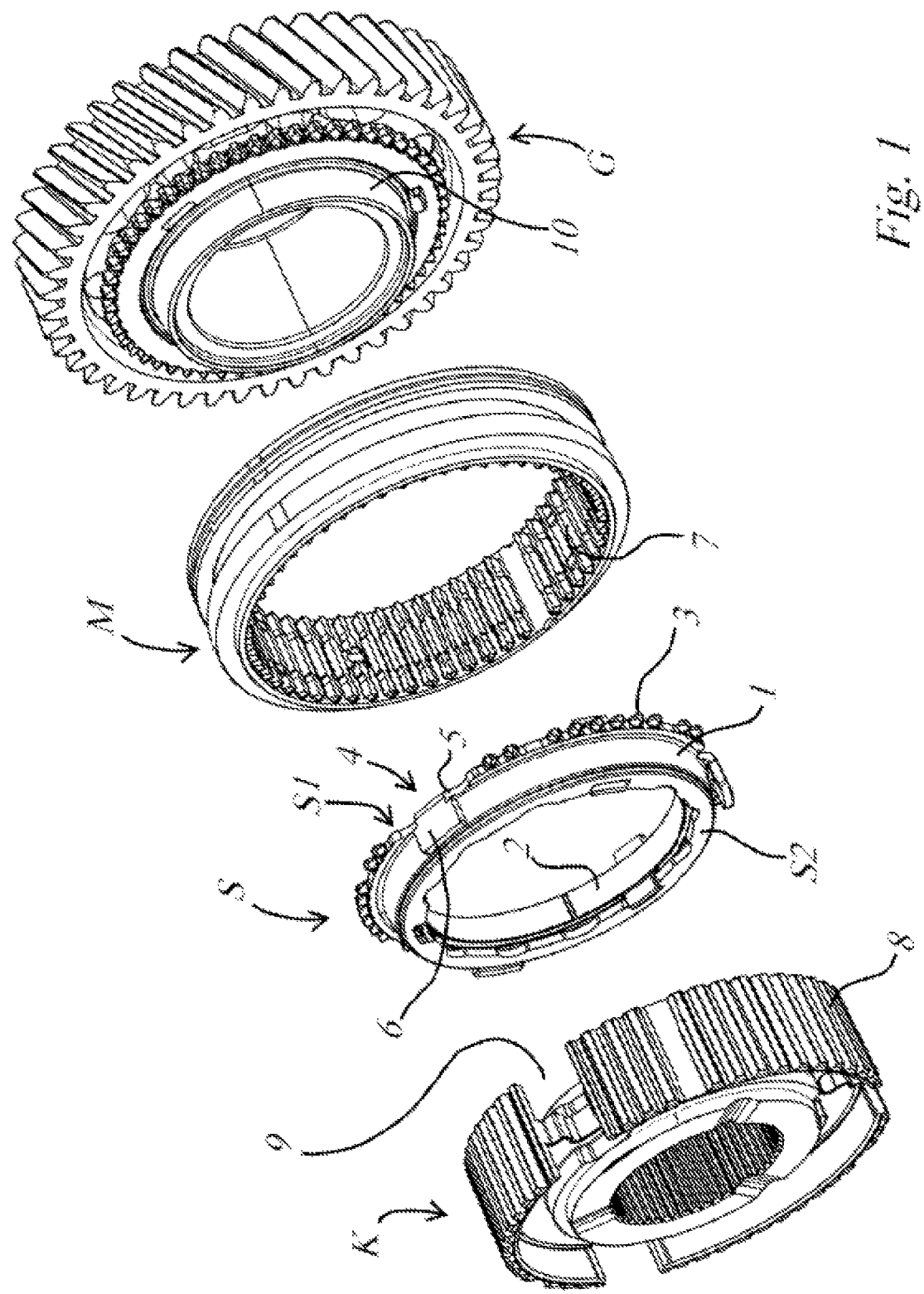
FIG. 1 is a diagrammatic, perspective view of a synchronizing device.

Referring now to the figures of the drawings in detail and first, particularly to FIG. 1 thereof, there is shown a synchronizer ring S produced from steel in a perspective view. The synchronizer ring S has a main body 1, on an inside of which a first conical friction surface 2 is formed. A first end face of the main body 1 is denoted by reference sign S1, and a second end face situated opposite the first end face S1 is denoted by the reference sign S2. Toothing sections 3 extend radially outward from a circumferential section adjoining the first end face S1. A gap, from which a blocking body denoted overall by the reference sign 4 extends radially outward, is formed between each two adjacent toothing sections 3.

The blocking body 4 is formed by a tab, which is connected integrally to the main body 1 and has a bent over section 5 and an engagement section 6 extending from the latter. The engagement section 6 extends in the axial direction.

The synchronizing device shown in FIG. 1 furthermore has a shift collar M, which has an internal toothing 7 corresponding to the toothing sections 3. A synchronizer body K connected for conjoint rotation to a shaft (not shown here) has an external toothing 8 corresponding to the internal toothing 7. The external toothing 8 is formed in sections. Reference sign 9 denotes recesses which correspond to the engagement section 6. Finally, reference sign G denotes a gearwheel configured as a free gear, which has a second conical friction surface 10 corresponding to the first conical friction surface 2 of the synchronizer ring S.

As can be seen especially from FIG. 2, the engagement section 6 has a first edge 11 extending in the circumferential direction and two mutually opposite second edges 12 extending in the axial direction. Reference sign T1 denotes a maximum first depth of the engagement section 6, which corresponds substantially to the length of the second edges 12. A second depth T2 denotes an axial distance from the first edge 11 in the direction of the bent over section 5.

The first edge 11 has a first width B1. In the case of the second depth T2, a distance extending in the circumferential direction between the mutually opposite second edges 12 corresponds to the second width B2. The following relationship preferably applies to the second depth T2:

$$T2 = T1 * F,$$

wherein F is a factor in the range of 0.1 to 1.0, preferably 0.2 to 0.9, particularly preferably 0.3 to 0.8. That is to say that the convex curvature of the second edges 12 can be at its maximum in the vicinity of the first depth T1, for example. The greater the second depth T2 selected, the smaller is a distance A between the force application point P defined by the second width B2 and the boundary between the engagement section 6 and the bent over section 5. The smaller the distance A, the smaller are the loads acting on the bent over section 5, thereby reducing the probability of fracture of the tab.

Although it is not shown in the illustrative embodiment under consideration, each of the second edges 12 can also have a plurality of convex curvatures. That is to say that the second edges 12 can also be of corrugated configuration. The convex shape of the second edges 12 can be formed by a combination of any desired curve shapes. That is to say that the second edges 12 can have asymmetrically convex shapes.

The following is a summary list of reference numerals and the corresponding structure used in the above description of the invention:

1 main body
2 first conical friction surface
3 toothing section
4 blocking body
5 bent over section
6 engagement section
7 internal toothing
8 external toothing
9 recess
10 second conical friction surface
A distance
B1 first width
B2 second width
T1 first depth
T2 second depth
S synchronizer ring
S1 first end face of the main body 1
S2 second end face of the main body 1
M shift collar, sliding collar
K synchronizer body
G gearwheel, free gear, gear
P force application point

The invention claimed is:

1. A synchronizer ring formed from steel, comprising:
a main body having a conical friction surface, a first end face and a second end face;
toothing sections projecting radially outward from said main body; and
at least one blocking body projecting radially outward from said main body, said blocking body having an engagement section extending in an axial direction, said engagement section having a first edge running equidistant to said first end face of said main body and having a first width extending in a circumferential direction, and two mutually opposite second edges extending from said first edge, said two mutually opposite second edges having a convex curvature in a radial plan view of said engagement section, wherein said engagement section having a second width extending in the circumferential direction between said two mutually opposite second edges and being greater than the first width at a depth spaced apart from said first edge.

2. The synchronizer ring according to claim 1, wherein a ratio of the first width to the second width is:

$$B2 = B1 * K,$$

wherein:
K is a factor in a range of 1.005 to 1.09;
B1 is the first width; and
B2 is the second width.

3. The synchronizer ring according to claim 1, wherein said main body has a circumferential section adjoining said first end face of said main body and said toothing sections extend from said circumferential section.

4. The synchronizer ring according to claim 3, wherein said blocking body is formed by a tab extending from said circumferential section, wherein said tab has a bent over section and said engagement section, said engagement section extends from said bent over section in the axial direction to said second end face situated opposite said first end face of said main body.

5. The synchronizer ring according to claim 1, wherein said toothing sections are formed in sections in the circumferential direction.

6. The synchronizer ring according to claim 1, wherein said blocking body or a centering tab extends in each gap formed between two adjacent ones of said toothing sections.

7. The synchronizer ring according to claim 1, wherein the convex curvature of said two mutually opposite second edges of said engagement section is produced by means of shearing.

\* \* \* \* \*